(12) United States Patent
Nieh

(10) Patent No.: US 11,108,335 B1
(45) Date of Patent: Aug. 31, 2021

(54) MEDIUM- AND HIGH-POWER FREQUENCY-ADJUSTABLE DIGITAL POWER SYSTEM

(71) Applicant: ELEMENTECH INTERNATIONAL CO., LTD., Taipei (TW)

(72) Inventor: Ming-Han Nieh, Taipei (TW)

(73) Assignee: ELEMENTECH INTERNATIONAL CO., LTD., Taipei (TW)

( * ) Notice: Subject to any disclaimer, the term of this patent is extended or adjusted under 35 U.S.C. 154(b) by 0 days.

(21) Appl. No.: 16/868,494

(22) Filed: May 6, 2020

(51) Int. Cl.
*H02M 5/458* (2006.01)
*H05H 1/46* (2006.01)
*H02M 1/36* (2007.01)

(52) U.S. Cl.
CPC ............ *H02M 5/458* (2013.01); *H02M 1/36* (2013.01); *H05H 1/46* (2013.01)

(58) Field of Classification Search
CPC .......... H02M 5/458; H02M 1/36; H05H 1/46
See application file for complete search history.

(56) References Cited

U.S. PATENT DOCUMENTS

| 6,670,780 | B2 * | 12/2003 | Ono | H05B 41/2925 |
| | | | | 315/174 |
| 9,041,327 | B2 * | 5/2015 | Breitzmann | H02P 3/22 |
| | | | | 318/400.22 |
| 9,054,621 | B2 * | 6/2015 | Liu | H02P 21/0003 |
| 9,872,719 | B2 * | 1/2018 | Johnson | A61B 18/1206 |
| 2010/0006551 | A1 * | 1/2010 | Geissler | B23K 9/1018 |
| | | | | 219/130.1 |

FOREIGN PATENT DOCUMENTS

CN 105048858 A 11/2015

OTHER PUBLICATIONS

Office Action dated Jan. 28, 2021 of the corresponding Taiwan patent application No. 109113336.

* cited by examiner

*Primary Examiner* — Dinh T Le
(74) *Attorney, Agent, or Firm* — Chun-Ming Shih; HDLS IPR Services

(57) ABSTRACT

A medium- and high-power frequency adjustable digital power system includes a switch switching circuit, an output sampling circuit, and a microcontroller. The switch switching circuit has a plurality of switches, receives an AC input power source and converts the AC input power source into an output power source. The output sampling circuit receives an output voltage and an output current of the output power source. The microcontroller receives the output voltage and the output current, and generates a plurality of control signals according to power information calculated by the output voltage and the output current to correspondingly control turning on and turning off the switches.

9 Claims, 5 Drawing Sheets

MEDIUM- AND HIGH-POWER FREQUENCY-ADJUSTABLE DIGITAL POWER SYSTEM

BACKGROUND

Technical Field

The present disclosure relates to a digital power source, and more particularly to a medium- and high-power frequency-adjustable digital power system.

Description of Related Art

The statements in this section merely provide background information related to the present disclosure and do not necessarily constitute prior art.

Plasma is composed of electrons, positive and negative charges, neutral gas molecules, and free radicals. It is another material state (or called fourth state) following the three-state theory of matter (solid state, gas state, and liquid state). The so-called plasma is electrically neutral under normal circumstances, which means that the number of positively charged ions is equal to the number of negatively charged electrons. For a long time, in the electronic information industry such as semiconductors and optoelectronics, plasma has been popularized and widely used in the manufacture of various components, such as computer chips, memories, hard drives, transistors, optical discs, liquid crystal displays, plasma displays, etc. For example, the plasma technology is applied to modification, epitaxy, etching, sputtering, and auxiliary chemical vapor deposition coatings, etc. Especially, precision optics, surface treatment of important sensing elements and biomedical materials, etc., all need to rely on the plasma technology. Therefore, the development of the plasma technology has a considerable impact on the development of these industries.

Generally, in the plasma process, a low-pressure gas is injected into a cavity close to vacuum and a voltage is applied to the gas, and therefore gas molecules can form a plasma state by properly matching of gas pressure, voltage, and current. Since the uniformity and stability of the semiconductor coating must be considered, the general control of the voltage and current of the gas is to control the reaction interval of the gas in the glow discharge so that the electrons of the gas molecules are given enough energy to increase the degree of ionization of the gas molecules to form the plasma state.

However, for the semiconductor manufacturing process, maintaining the stability of the plasma power supply is as important as controlling the gas. Since the power supply module, control interface, motor, and gas control part of the general plasma reaction equipment are individually configured, each has its own independent wiring and independent power supply, which not only the construction cost is high but also the volume is large.

For this reason, how to design a medium- and high-power frequency adjustable digital power system, whose high voltage output can be used as a high voltage of a plasma power supply, is an important subject studied by the inventor of the present disclosure.

SUMMARY

An object of the present disclosure is to provide a medium- and high-power frequency-adjustable digital power system to output an AC output power source, which is used as a high voltage of a plasma power supply.

In order to achieve the above-mentioned object, the medium- and high-power frequency-adjustable digital power system includes a switch switching circuit, an output sampling circuit, and a microcontroller. The switch switching circuit has a plurality of switches, receives an AC input power source and converts the AC input power source into an output power source. The output sampling circuit receives an output voltage and an output current of the output power source. The microcontroller receives the output voltage and the output current, and generates a plurality of control signals according to power information calculated by the output voltage and the output current to correspondingly control turning on and turning off the switches.

In one embodiment, the microcontroller includes an analog-to-digital conversion unit, a power calculation unit, and a control signal generation unit. The analog-to-digital conversion unit receives the output voltage and the output current, and converts the output voltage and the output voltage into a digital voltage signal and a digital current signal. The power calculation unit is coupled to the analog-to-digital conversion unit, receives the digital voltage signal and the digital current signal, and calculates the power information according to the digital voltage signal and the digital current signal. The control signal generation unit is coupled to the power calculation unit, receives the power information, and generates the control signals according to the power information.

In one embodiment, the medium- and high-power frequency-adjustable digital power system further includes a step-up transformer. The step-up transformer is electrically coupled to the switch switching circuit, receives the output power source, and steps up the output power source to provide an AC output power source.

In one embodiment, the medium- and high-power frequency-adjustable digital power system further includes a driver circuit. The driver circuit is electrically coupled to the microcontroller and the switch switching circuit, receives the control signals, and converts the control signals into a plurality of driver signals to correspondingly drive the switches.

In one embodiment, the medium- and high-power frequency-adjustable digital power system further includes an input sampling circuit. The input sampling circuit receives an input voltage of the AC input power source.

In one embodiment, the microcontroller controls turning on and turning off the switches by a phase shifted full bridge manner.

In one embodiment, the microcontroller is configured to provide an over voltage protection for the input voltage and a under voltage protection for the input voltage according to a voltage magnitude of the input voltage.

In one embodiment, the microcontroller provides an over voltage protection for the output voltage or a under voltage protection for the output voltage according to a voltage magnitude of the output voltage.

In one embodiment, the microcontroller is configured to provide an over current protection for the output current according to a current magnitude of the output current.

In one embodiment, the AC output power source is used as a high voltage of a plasma power supply.

In one embodiment, an output power of the digital power system is 1200 watts.

Accordingly, the medium- and high-power frequency-adjustable digital power system outputs an AC output power source, which is used as a high voltage of a plasma power supply.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
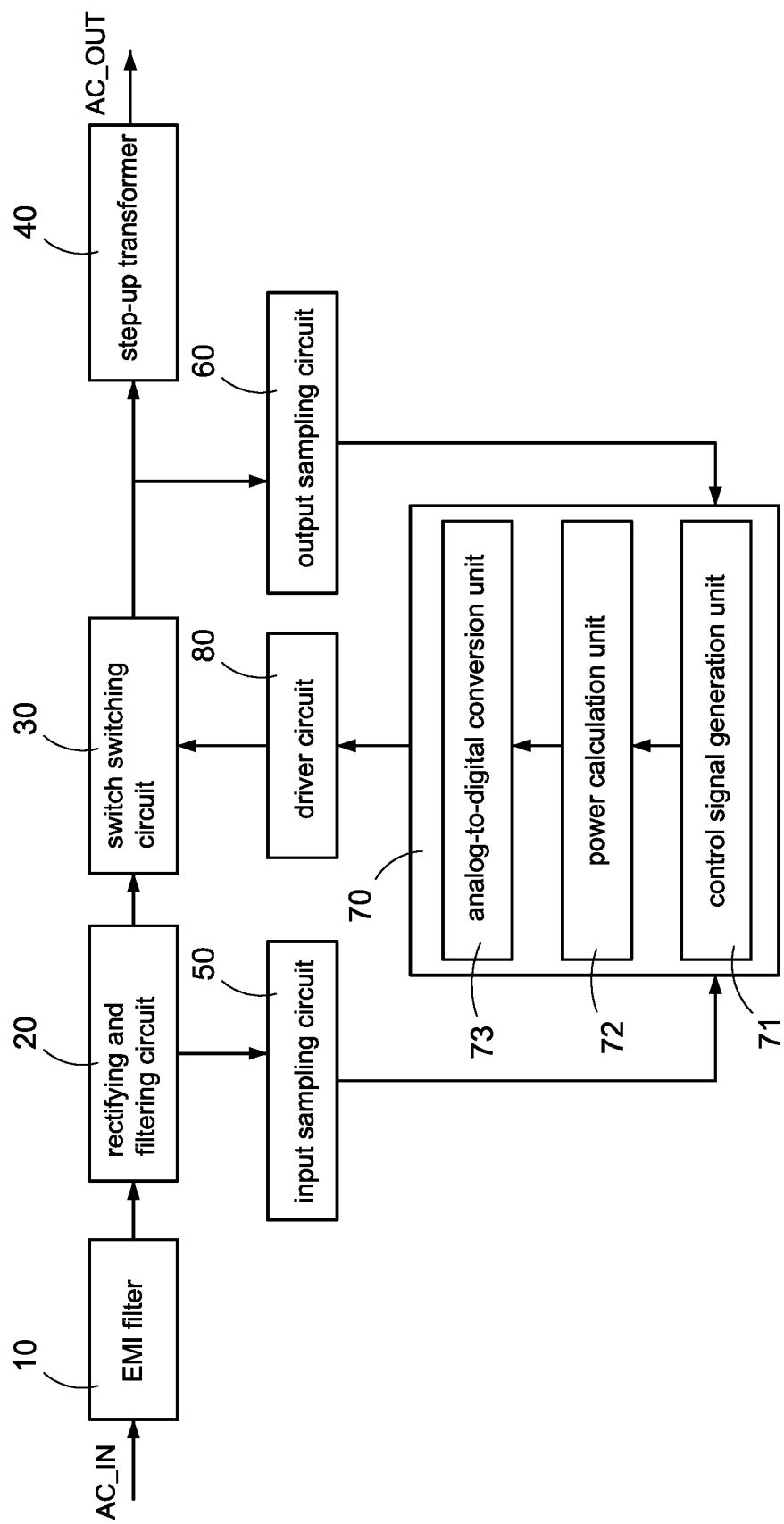
FIG. 1 is a schematic block diagram of a medium- and high-power frequency-adjustable digital power system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic block diagram of a medium- and high-power frequency-adjustable digital power system according to the present disclosure. The medium- and high-power frequency-adjustable digital power system receives an AC input power source AC_IN and converts the AC input power source AC_IN to output an AC output power source AC_OUT. The medium- and high-power frequency-adjustable digital power system includes an EMI filter 10, a rectifying and filtering circuit 20, a switch switching circuit 30, a step-up transformer 40, an input sampling circuit 50, an output sampling circuit 60, a microcontroller 70, and a driver circuit 80.

Figure 2:
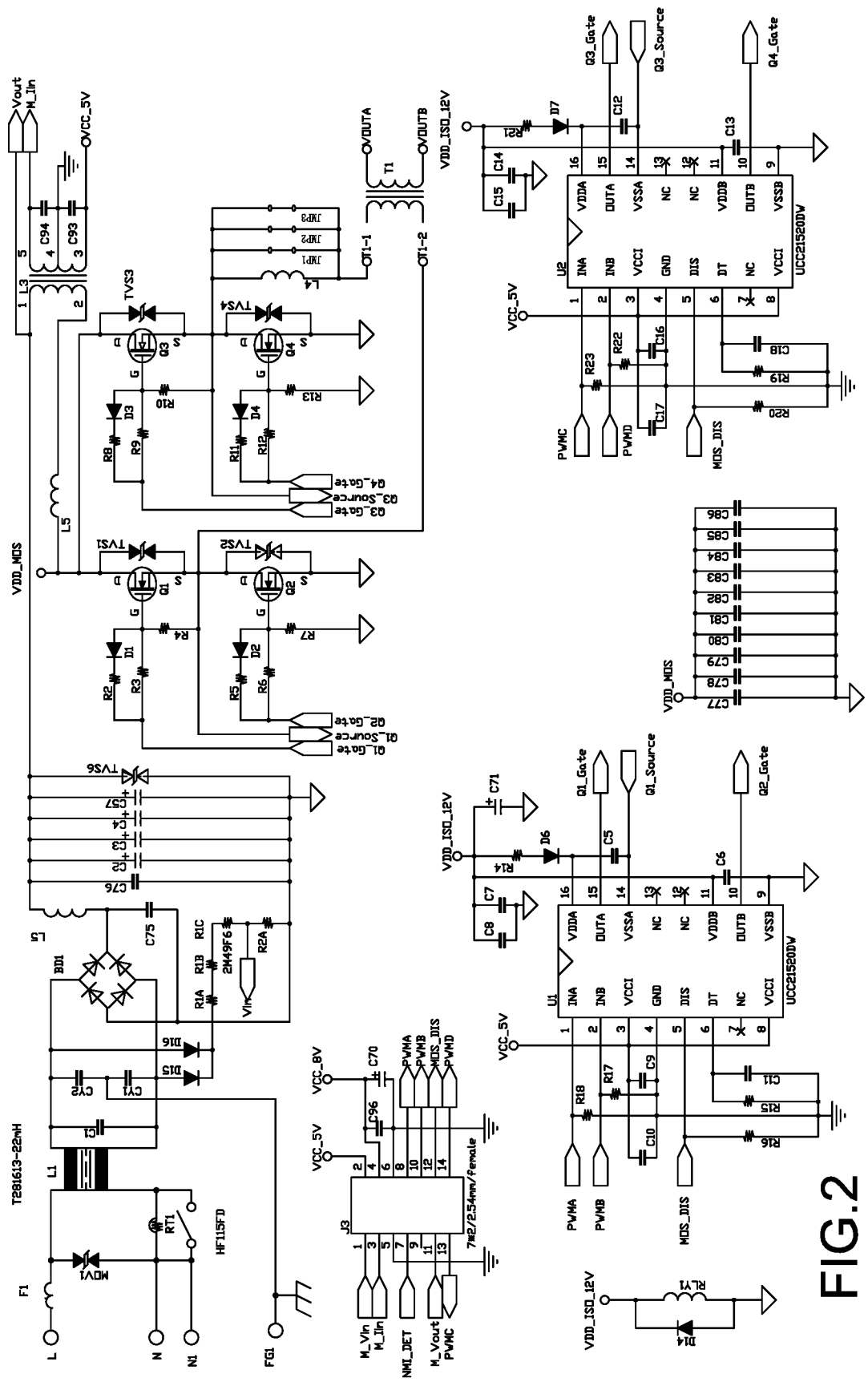
FIG. 2 is a circuit diagram of the medium- and high-power frequency-adjustable digital power system according to the present disclosure.

Please also refer to FIG. 2, which shows a circuit diagram of the medium- and high-power frequency-adjustable digital power system according to the present disclosure. The EMI filter 10 receives the AC input power source AC_IN, and is used to suppress (filter) the external electromagnetic interference introduced into the AC input power source AC_IN through AC power lines. As shown in FIG. 2, the EMI filter 10 is composed of an inductor (L1) and a plurality of capacitors (C1,CY1,CY2). The rectifying and filtering circuit 20 is electrically coupled to the EMI filter 10, and the rectifying and filtering circuit 20 has functions of rectifying and filtering. As shown in FIG. 2, a diode bridge (BD1) is provided to full-wave rectify the AC input power source AC_IN outputted from the EMI filter 10, and an inductor (L5) and a capacitor (C75) are provided to filter the AC input power source AC_IN rectified from the diode bridge (BD1).

The switch switching circuit 30 is electrically coupled to the rectifying and filtering circuit 20. As shown in FIG. 2, a main structure of the switch switching circuit 30 includes a first switch (Q1), a second switch (Q2), a third switch (Q3), and a fourth switch (Q4). The switches (Q1-Q4) are controlled to be turning on and turning off by a phase shifted full bridge (PSFB) manner so as to control the output voltage and the output current from the switch switching circuit 30. Specifically, as shown in FIG. 2, MOSFETs are exemplified as the switches (Q1-Q4). The driver circuit 80 includes two gate driver ICs having a first gate driver IC (U1) and a second gate driver IC (U2), respectively. Each gate driver IC has internal electrical isolation. Take the first gate driver IC (U1) for example, its input side (left side) is a non-isolation side, which is supplied power by VCC_5V, and its output side (right side) is an isolation side, which is supplied power by VDD_ISO_12V. The input side of the first gate driver IC (U1) receives PWM signals (PWMA,PWMB) provided from the microcontroller 70. The first gate driver IC (U1) generates a first gate driver signal (Q1_Gate) and a second gate driver signal (Q2_Gate) according to the PWM signals (PWMA,PWMB) to respectively control turning on and turning off the first switch (Q1) and the second switch (Q2). Similarly, the input side of the second gate driver IC (U2) receives PWM signals (PWMC,PWMD) provided from the microcontroller 70. The second gate driver IC (U2) generates a third gate driver signal (Q3_Gate) and a fourth gate driver signal (Q4_Gate) according to the PWM signals (PWMC,PWMD) to respectively control turning on and turning off the third switch (Q3) and the fourth switch (Q4).

The step-up transformer 40, i.e., a transformer (T1) shown in FIG. 2, is electrically coupled to the switch switching circuit 30, and steps up the output voltage generated from the switch switching circuit 30. For example, take the AC input power source AC_IN of 220 volts as an example, and the converted output voltage is approximately 300 volts. By a design of coil turns ratio between a secondary side and a primary side of the step-up transformer 40, the 300-volt output voltage is stepped up to the 10000-volt AC output power source AC_OUT. The AC output power source AC_OUT with the high voltage (10000 volts) can provide appropriate power supply requirement, for example, the AC output power source AC_OUT is used as a high voltage of a plasma power supply.

Figure 3:
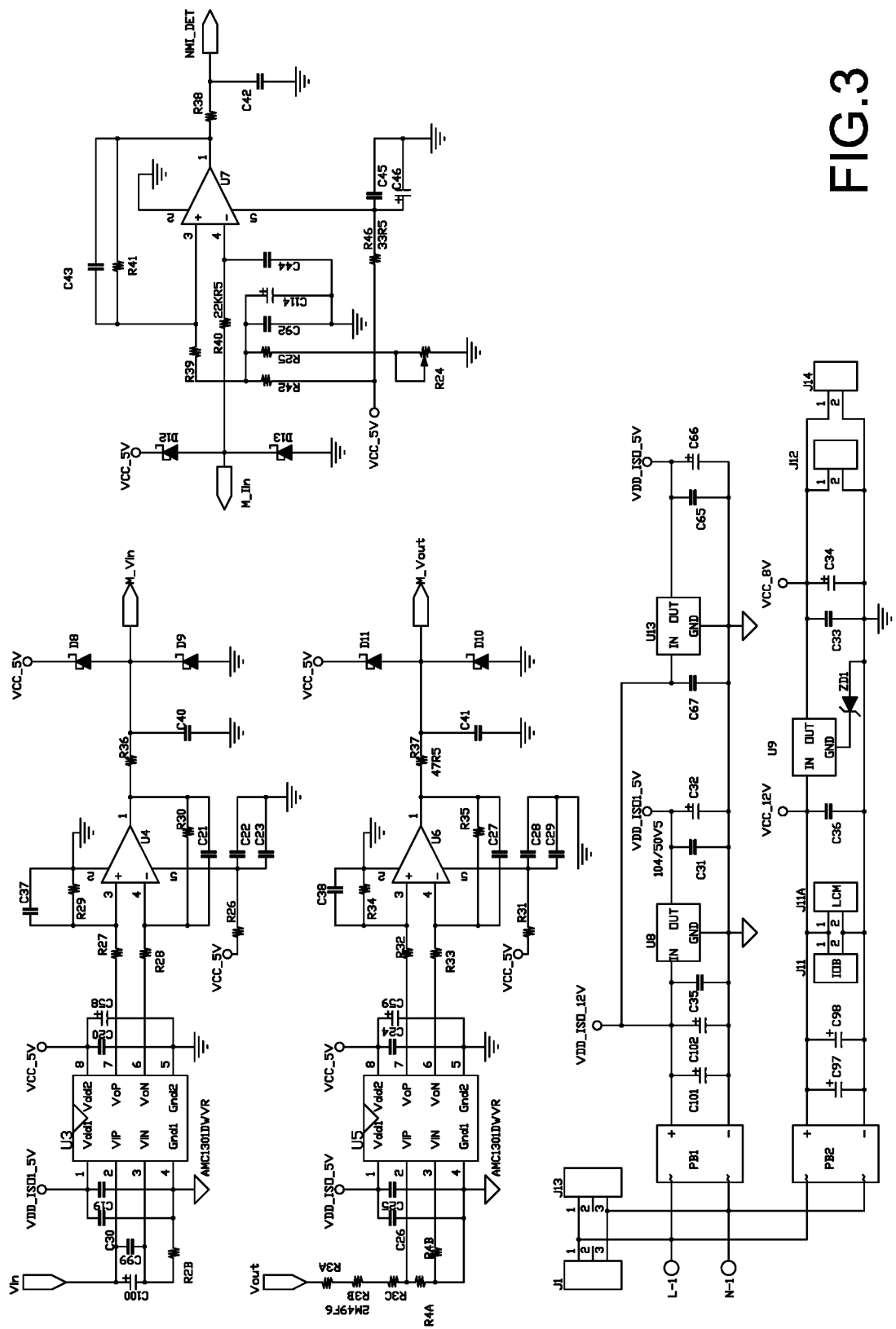
FIG. 3 is a circuit diagram of an input sampling circuit and an output sampling circuit of the medium- and high-power frequency-adjustable digital power system according to the present disclosure.

The input sampling circuit 50 is electrically coupled to the rectifying and filtering circuit 20 for measuring a voltage magnitude of the AC input power source AC_IN. As shown in FIG. 3, the input sampling circuit 50 has a third IC (U3) having internal electrical isolation, its input side (left side) is an isolation side, which is supplied power by VCC_ISO1_5V, and its output side (right side) is a non-isolation side, which is supplied power by VCC_5V. An input side of the input sampling circuit 50 receives the AC input power source AC_IN by a pin (Vin) thereof, and measures the voltage magnitude of the AC input power source AC_IN, such as 220 volts, and converts the AC input power source AC_IN by a gain circuit, which is composed of an operational amplifier (U4) and a resistor-capacitor network, at an output side to acquire a measurement voltage (M_Vin) with a voltage magnitude between 0 to 5 volts, and transmits the measurement voltage (M_Vin) to the microcontroller 70.

The output sampling circuit 60 is electrically coupled to the switch switching circuit 30 for measuring a voltage magnitude of the output voltage and a current magnitude of the output current. As shown in FIG. 3, the output sampling circuit 60 has a fifth IC (U5) having internal electrical isolation, its input side (left side) is an isolation side, which is supplied power by VCC_ISO_5V, and its output side (right side) is a non-isolation side, which is supplied power by VCC_5V. An input side of the output sampling circuit 60 receives the output voltage by a pin (Vout) thereof, and measures the voltage magnitude of the output voltage, such as 300 volts, and converts the output voltage by a gain circuit, which is composed of an operational amplifier (U6) and a resistor-capacitor network, at an output side to acquire a measurement voltage (M_Vout) with a voltage magnitude between 0 to 5 volts, and transmits the measurement voltage (M_Vin) to the microcontroller 70.

Furthermore, in this embodiment, a Hall sensor is used to measure the output current, and the measured output current is converted to a measurement current (M_Iin) with a voltage magnitude between 0 to 5 volts, and the measurement current (M_Iin) is transmitted to the microcontroller 70. As shown in FIG. 3, a converter, which is composed of an operational amplifier (U7) and a resistor-capacitor network, receives the measurement current (M_Iin) transmitted from the Hall sensor, and converts the measurement current (M_Iin) into a signal (NMI_DET) for a hardware interruption protection—an over current protection (OCP). In other words, if the output current is too large, it can provide the over current protection according to the converted signal (NMI_DET) corresponding to the measurement current (M_Iin), that is, the over current protection is implemented by monitoring (measuring) the output current.

Figure 4:
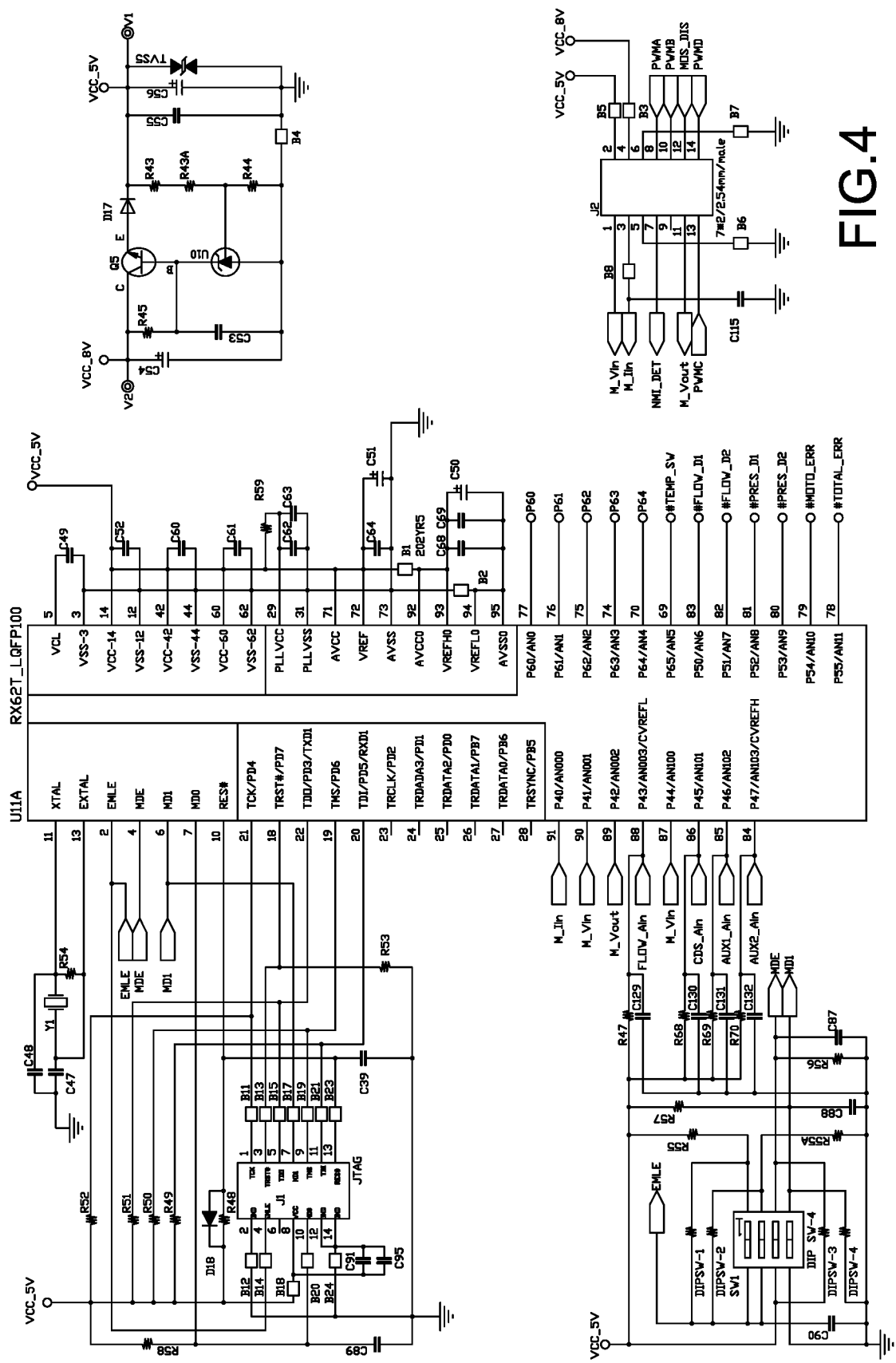
FIG. 4 is a circuit diagram of a first part of a microcontroller of the medium- and high-power frequency-adjustable digital power system according to the present disclosure.
Figure 5:
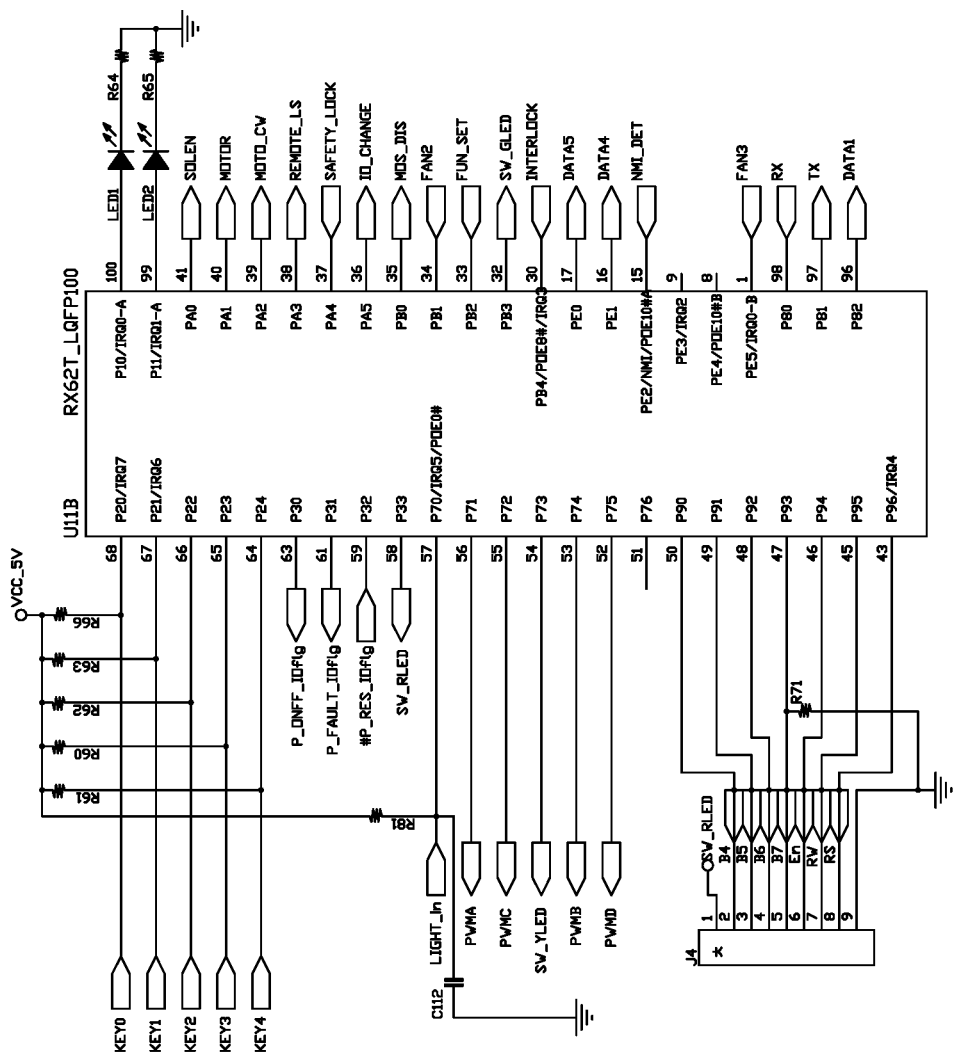
FIG. 5 is a circuit diagram of a second part of the microcontroller of the medium- and high-power frequency-adjustable digital power system according to the present disclosure.

As shown in FIG. 1, the microcontroller 70 includes an analog-to-digital conversion unit 71, a power calculation unit 72, and a control signal generation unit 73. In this embodiment, the microcontroller 70 is, for example but not limited to, RX62T_LQFP100, which is a 32-bit microcontroller with 100 pins. The microcontroller (RX62T_LQFP100) is presented as U11A and U11B shown in FIG. 4 and FIG. 5, respectively. The analog-to-digital conversion unit 71 of the microcontroller 70 receives a measurement voltage (M_Vin) with a voltage magnitude between 0 to 5 volts, and the measurement voltage (M_Vin) is received by $90^{th}$ pin shown in FIG. 4. The analog-to-digital conversion unit 71 receives a measurement voltage (M_Vout) with a voltage magnitude between 0 to 5 volts, and the measurement voltage (M_Vout) is received by $89^{th}$ pin shown in FIG. 4. The analog-to-digital conversion unit 71 receives a measurement current (M_Iin) with a voltage magnitude between 0 to 5 volts, and the measurement current (M_Iin) is received by $91^{st}$ pin shown in FIG. 4. Take the input voltage (i.e., the measurement voltage (M_Vin)) for example, the analog-to-digital conversion unit 71 converts the measurement voltage (M_Vin) of 0 to 5 volts into a 16-bit binary digital signal. Similarly, the analog-to-digital conversion unit 71 converts the measurement voltage (M_Vout) of 0 to 5 volts and the measurement current (M_Iin) into 16-bit binary digital signals, respectively.

The power calculation unit 72 is coupled to the analog-to-digital conversion unit 71, and receives the 16-bit binary digital signal outputted from the analog-to-digital conversion unit 71 corresponding to the output voltage and receives the 16-bit binary digital signal outputted from the analog-to-digital conversion unit 71 corresponding to the output current. The power calculation unit 72 calculates an output power of the digital power system according to the output voltage represented by the 16-bit binary digital signal and the output current represented by the 16-bit binary digital signal. Since the output voltage is almost constant, the relationship between the output power of the digital power system and the output current is positively related, that is, the greater the output current, the greater the output power, and vice versa. In this embodiment, the output power of the digital power system is approximately 1200 watts, which can be regarded as a medium- and high-power power system.

The control signal generation unit 73 is coupled to the power calculation unit 72, and receives output power information calculated by the power calculation unit 72. In this embodiment, the control signal generation unit 73 is a PWM signal generator. The control signal generation unit 73 outputs a PWM signal (PWMA) from $56^{th}$ pin shown in FIG. 5 according to the output power information provided by the power calculation unit 72. The control signal generation unit 73 outputs a PWM signal (PWMB) from $53^{rd}$ pin shown in FIG. 5. The control signal generation unit 73 outputs a PWM signal (PWMC) from $55^{th}$ pin shown in FIG. 5. The control signal generation unit 73 outputs a PWM signal (PWMD) from $52^{nd}$ pin shown in FIG. 5. As shown in FIG. 2, the PWM signals (PWMA,PWMB) are provided to the first gate driver IC (U1) and the PWM signals (PWMC,PWMD) are provided to the second gate driver IC (U2) so that the first gate driver IC (U1) generates the first gate driver signal (Q1_Gate) and the second gate driver signal (Q2_Gate) according to the PWM signals (PWMA,PWMB) to respectively control turning on and turning off the first switch (Q1) and the second switch (Q2), and the second gate driver IC (U2) generates the third gate driver signal (Q3_Gate) and the fourth gate driver signal (Q4_Gate) according to the PWM signals (PWMC,PWMD) to respectively control turning on and turning off the third switch (Q3) and the fourth switch (Q4), thereby controlling (adjusting) the output power of the digital power system.

Furthermore, the microcontroller 70 can provide an over voltage protection (OVP) or a under voltage protection (UVP) for the input voltage according to the voltage magnitude of the measurement voltage (M_Vin) corresponding to the AC input power source AC_IN. Similarly, the microcontroller 70 can provide an over voltage protection (OVP) or a under voltage protection (UVP) for the output voltage according to the voltage magnitude of the measurement voltage (M_Vout) corresponding to the output voltage.

In conclusion, the present disclosure has following features and advantages:

1. The step-up transformer is used to step up the output voltage to the 10000-volt AC output power source, and the AC output power source is used as a high voltage of a plasma power supply.

2. By using the digital processing of the microcontroller, the use of the analog circuit can be greatly reduced, and therefore the occupied area and the required cost can be reduced.

3. The microcontroller can provide OVP and UVP for the input voltage according to the voltage magnitude of the input voltage, provide OVP and UVP for the output voltage according to the voltage magnitude of the output voltage, and provide OCP for the output current according to the current magnitude of the output current.

4. The operation frequency can be adjusted through, for example, the knob or the button on a panel to implement the frequency-adjustable function.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A medium- and high-power frequency-adjustable digital power system comprising:
 a switch switching circuit having a plurality of switches, configured to receive an AC input power source and convert the AC input power source into an output power source,
 an output sampling circuit electrically coupled to the switch switching circuit, and configured to receive an output voltage and an output current of the output power source,
 a microcontroller comprising:
 an analog-to-digital conversion unit configured to receive the output voltage and the output current, and convert the output voltage and the output voltage into a digital voltage signal and a digital current signal,
 a power calculation unit coupled to the analog-to-digital conversion unit, configured to receive the digital voltage signal and the digital current signal, and calculate the power information according to the digital voltage signal and the digital current signal, and
 a control signal generation unit coupled to the power calculation unit, configured to receive the power information, and generate the control signals according to the power information calculated by multiplying the output voltage and the output current to correspondingly control turning on and turning off the switches, and
 a driver circuit comprising:
 a first gate driver and a second gate driver, electrically coupled to the microcontroller and the switch switching circuit, configured to receive the control signals provided from the control signal generation unit of the microcontroller, and convert the control signals into a plurality of driver signals to correspondingly drive the switches.

2. The medium- and high-power frequency-adjustable digital power system in claim 1, further comprising:
 a step-up transformer electrically coupled to the switch switching circuit, configured to receive the output power source, and step up the output power source to provide an AC output power source.

3. The medium- and high-power frequency-adjustable digital power system in claim 1, further comprising:
 an input sampling circuit configured to receive an input voltage of the AC input power source.

4. The medium- and high-power frequency-adjustable digital power system in claim 1, wherein the microcontroller controls turning on and turning off the switches by a phase shifted full bridge manner.

5. The medium- and high-power frequency-adjustable digital power system in claim 3, wherein the microcontroller is configured to provide an over voltage protection for the input voltage and an under voltage protection for the input voltage according to a voltage magnitude of the input voltage.

6. The medium- and high-power frequency-adjustable digital power system in claim 1, wherein the microcontroller is configured to provide an over voltage protection for the output voltage or a under voltage protection for the output voltage according to a voltage magnitude of the output voltage.

7. The medium- and high-power frequency-adjustable digital power system in claim 1, wherein the microcontroller is configured to provide an over current protection for the output current according to a current magnitude of the output current.

8. The medium- and high-power frequency-adjustable digital power system in claim 2, wherein the AC output power source is a high voltage for a plasma power supply.

9. The medium- and high-power frequency-adjustable digital power system in claim 1, wherein an output power of the medium- and high-power frequency-adjustable digital power system is 1200 watts.

* * * * *